United States Patent
Cho et al.

(10) Patent No.: US 10,316,155 B2
(45) Date of Patent: Jun. 11, 2019

(54) COMPOSITION FOR PREPARING POLYIMIDE-INORGANIC COMPOSITE MATERIAL, AND ARTICLE PREPARED BY USING SAME

(71) Applicant: SAMSUNG ELECTRONICS CO., LTD., Suwon-si, Gyeonggi-do (KR)

(72) Inventors: Chung Kun Cho, Suwon-si (KR); Woo-Jin Bae, Yongin-si (KR); Fedosya Kalinina, Hwaseong-si (KR); Mikhail Kovalev, Suwon-si (KR)

(73) Assignee: SAMSUNG ELECTRONICS., LTD., Gyeonggi-Do (KR)

( * ) Notice: Subject to any disclaimer, the term of this patent is extended or adjusted under 35 U.S.C. 154(b) by 330 days.

(21) Appl. No.: 14/625,348

(22) Filed: Feb. 18, 2015

(65) Prior Publication Data

US 2015/0361232 A1 Dec. 17, 2015

(30) Foreign Application Priority Data

Jun. 16, 2014 (KR) .................. 10-2014-0073149

(51) Int. Cl.
| | |
|---|---|
| C08J 5/18 | (2006.01) |
| C08L 79/08 | (2006.01) |
| C09J 179/08 | (2006.01) |
| C09D 179/08 | (2006.01) |
| C09J 177/10 | (2006.01) |
| C08L 77/10 | (2006.01) |
| C09D 177/10 | (2006.01) |
| C08K 3/36 | (2006.01) |
| C08G 73/10 | (2006.01) |

(52) U.S. Cl.
CPC ............ *C08J 5/18* (2013.01); *C08G 73/1017* (2013.01); *C08G 73/1039* (2013.01); *C08G 73/1042* (2013.01); *C08G 73/1067* (2013.01); *C08K 3/36* (2013.01); *C09D 179/08* (2013.01); *C09J 179/08* (2013.01); *C08J 2379/08* (2013.01)

(58) Field of Classification Search
None
See application file for complete search history.

(56) References Cited

FOREIGN PATENT DOCUMENTS

| | | |
|---|---|---|
| JP | 2005-105158 | 4/2005 |
| JP | 2005-187768 | 7/2005 |
| JP | 2008-064905 | 3/2008 |
| KR | 1020060047671 | 5/2006 |
| KR | 1020060084742 | 7/2006 |
| KR | 20110086726 | 7/2011 |

OTHER PUBLICATIONS

Grant & Hackh's Chemical Dictionary (5th Ed. 1987) at p. 148.*
Goto et al., Preparation and applications of novel fluoroalkyl end-capped oligomers/polyimide/silica nanocomposites. Polymer for Advanced Technologies, 2012, 23, 290-298.*

* cited by examiner

*Primary Examiner* — Po-Chih Chen
(74) *Attorney, Agent, or Firm* — Cantor Colburn LLP

(57) ABSTRACT

A composition for preparing a polyimide-inorganic composite material including: a polyamic acid represented by Chemical Formula 1, a polyimide represented by Chemical Formula 2, or a combination thereof; an inorganic particle precursor; and water, wherein the polyamic acid, the polyimide, or the combination thereof is a reaction product of a dicarboxylic acid anhydride and a diamine, wherein the mole ratio of the diamine to the dicarboxylic acid anhydride is greater than 0.93 and less than 0.95, and wherein the inorganic particle precursor is included in an amount to provide an inorganic particle in an amount of greater than or equal to about 30 weight % and less than or equal to about 60 weight % based the total weight of the polyimide-inorganic composite material prepared:

Chemical Formula 1

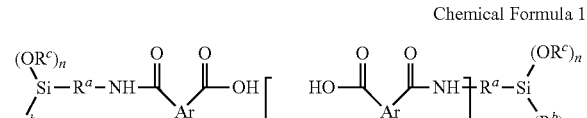

Chemical Formula 2

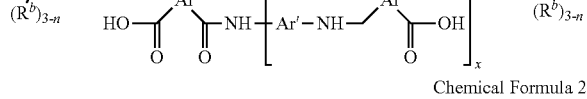

wherein in Chemical Formulae 1 and 2, groups and variable are the same as defined in the specification.

12 Claims, 5 Drawing Sheets

COMPOSITION FOR PREPARING POLYIMIDE-INORGANIC COMPOSITE MATERIAL, AND ARTICLE PREPARED BY USING SAME

CROSS-REFERENCE TO RELATED APPLICATION

This application claims priority to Korean Patent Application No. 10-2014-0073149, filed on Jun. 16, 2014, and all the benefits accruing therefrom under 35 U.S.C. § 119, the content of which is incorporated herein in its entirety by reference.

BACKGROUND

1. Field

This disclosure relates to a composition for preparing polyimide-inorganic composite material, and an article prepared from the composition.

2. Description of the Related Art

A colorless transparent material for diverse applications such as an optical lens, a functional optical film, and a disk substrate has drawn research interest. But as information devices are being further miniaturized and display devices providing higher resolution are developed, more functions and greater performance are desired from the material.

Therefore, there remains a need in a colorless transparent material having excellent transparency, heat resistance, mechanical strength, and flexibility to ensure high resolution.

SUMMARY

An embodiment provides a composition for preparing a polyimide-inorganic particle composite material having improved transparency for light and low coefficient of thermal expansion.

Another embodiment provides an article prepared from a composition for preparing a polyimide-inorganic composite material.

According to an embodiment, provided is a composition for preparing a polyimide-inorganic composite material including:

a polyamic acid represented by Chemical Formula 1, a polyimide represented by Chemical Formula 2, or a combination thereof;

an inorganic particle precursor; and water, wherein the polyamic acid, the polyimide, or the combination thereof is a reaction product of a dicarboxylic acid anhydride and a diamine, wherein a mole ratio of the diamine to the dicarboxylic acid anhydride is greater than 0.93 and less than 0.95, and wherein the inorganic particle precursor is included in an amount to provide an inorganic particle in an amount of greater than or equal to about 30 percent by weight and less than or equal to about 60 percent by weight based the total weight of the polyimide-inorganic composite material:

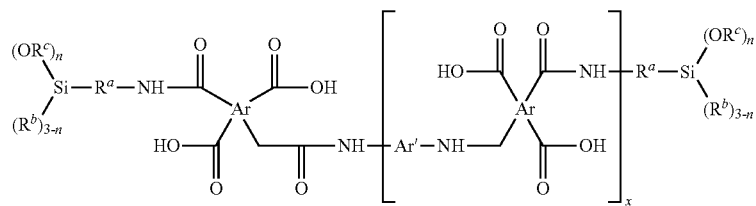

Chemical Formula 1

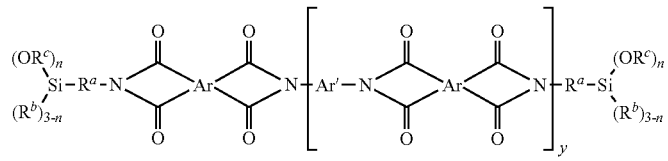

Chemical Formula 2

In Chemical Formulae 1 and 2,

Ar may be the same or different in each structure unit, and may be represented by Chemical Formula 3:

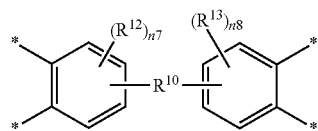

Chemical Formula 3

In Chemical Formula 3, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic organic group, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —OR$^{205}$, wherein R$^{205}$ is a substituted or unsubstituted C1 to C10 aliphatic organic group, or a silyl group of formula —SiR$^{209}$R$^{210}$R$^{211}$, wherein R$^{209}$, R$^{210}$, R$^{211}$ are the same or different and each are independently a hydrogen, or a substituted or unsubstituted C1 to C10 aliphatic organic group, and n7 and n8 are the same or different and each are independently an integer ranging from 0 to 3.

In Chemical Formulae 1 and 2,

Ar' may be the same or different in each structure unit, and may be represented by any one of Chemical Formulae 4 to 6:

Chemical Formula 4

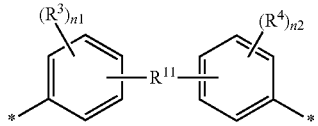

In Chemical Formula 4,

R$^{11}$ is a substituted or unsubstituted C3 to C30 alicyclic organic group, a substituted or unsubstituted C6 to C30 aromatic organic group, a substituted or unsubstituted C2 to C30 heterocyclic organic group, or a substituted or unsubstituted C13 to C20 fluorenylene group, R$^{3}$ and R$^{4}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —OR$^{200}$, wherein R$^{200}$ is a substituted or unsubstituted C1 to C10 aliphatic organic group, or a silyl group of formula —SiR$^{201}$R$^{202}$R$^{203}$ wherein R$^{201}$, R$^{202}$, and R$^{203}$ are the same or different and each are independently a hydrogen, or a substituted or unsubstituted C1 to C10 aliphatic organic group, and n1 and n2 are the same or different and each are independently an integer ranging from 0 to 4.

Chemical Formula 5

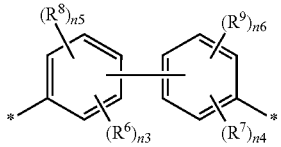

In Chemical Formula 5,

R$^{6}$ and R$^{7}$ are the same or different and each are independently an electron withdrawing group, R$^{8}$ and R$^{9}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{204}$, wherein R$^{204}$ is a substituted or unsubstituted C1 to C10 aliphatic organic group, or a silyl group of formula —SiR$^{205}$R$^{206}$R$^{207}$, wherein R$^{205}$, R$^{206}$, and R$^{207}$ are the same or different, and each are independently a hydrogen, or a substituted or unsubstituted C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 6

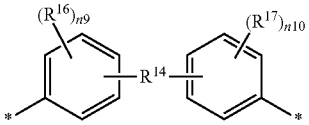

In Chemical Formula 6,

R$^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, R$^{16}$ and R$^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —OR$^{212}$, wherein R$^{212}$ is a substituted or unsubstituted C1 to C10 aliphatic organic group, or a silyl group of formula —SiR$^{213}$R$^{214}$R$^{215}$, wherein R$^{213}$, R$^{214}$, and R$^{215}$ are the same or different, and each are independently a hydrogen or a substituted or unsubstituted C1 to C10 aliphatic organic group, and n9 and n10 are each independently an integer ranging from 0 to 4.

In Chemical Formulae 1 and 2,

R$^{a}$ may be a substituted or unsubstituted C1-C30 alkylene, a substituted or unsubstituted C2-C30 alkenylene, a substituted or unsubstituted C2-C30 alkynylene, a substituted or unsubstituted C3-C30 cycloalkylene, a substituted or unsubstituted C3-C30 cycloalkenylene, a substituted or unsubstituted C8-C30 cycloalkynylene, a substituted or unsubstituted C6-C30 arylene, or a substituted or unsubstituted C7-C30 arylalkylene, R$^{b}$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein each of R$^{a}$ and R$^{b}$ may be substituted by an acryloxy group, glycidoxy group, or a isocyanato group, R$^{c}$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, and n may be an integer ranging from 1 to 3.

In Chemical Formulae 1 and 2, x and y are respectively an integer greater than or equal to 1.

Chemical Formula 3 may be represented by Chemical Formula 7 or 8:

Chemical Formula 7

Chemical Formula 8

In Chemical Formulae 7 and 8,
$R^{12}$, $R^{13}$, $n_7$, and $n_8$ are the same as in Chemical Formula 3.

Chemical Formula 3 may be represented by Chemical Formula 7, wherein both n7 and n8 are 0.

In Chemical Formula 4, $R^{11}$ may be selected from chemical formulae:

In Chemical Formula 5,
$R^6$ and $R^7$ may be the same or different, and may each be independently selected from —$CF_3$, —$CCl_3$, —$CBr_3$, —$Cl_3$, —$NO_2$, —CN, —$COCH_3$, and —$CO_2C_2H_5$.

In Chemical Formulae 1 and 2, Ar' may be represented by Chemical Formula 5, wherein both $R^6$ and $R^7$ may be —$CF_3$, both n3 and n4 may be 1, and both n5 and n6 may be 0.

In Chemical Formulae 1 and 2, x and y may be respectively an integer ranging from 10 to 100.

The inorganic particle precursor may be selected from an oxide or hydroxide of at least one selected from Ti, Si, Al, Zr, Sn, B, Ce, and a combination thereof.

The inorganic particle precursor may be a precursor of $SiO_2$ or $TiO_2$.

The precursor of $SiO_2$ may include a tetraalkoxysilane, for example, tetramethoxysilane (TMOS), tetraethoxysilane (TEOS), tetrapropoxysilane, tetraisopropoxysilane, tetrabutoxysilane, and the like.

In Chemical Formula 1 or 2, a part of Ar may be represented by Chemical Formula 9:

Chemical Formula 9

According to another embodiment, provided is an article prepared from a composition for preparing a polyimide-inorganic composite material.

The article may be a film, fiber, coating material, or an adhesive.

The article may have a transmittance of greater than or equal to about 80% for light in a wavelength range of from 400 nanometers to 750 nanometers.

The article may have a transmittance of greater than or equal to about 70% for light at a wavelength of 430 nanometers.

The article may have a coefficient of thermal expansion ("CTE") of less than or equal to about 50 parts per million/° C. (ppm/° C.) in a temperature range of from 50° C. to 400° C.

According to yet another embodiment, provided is a display device including the article according to an embodiment.

The display device may be an organic light emitting device ("OLED").

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
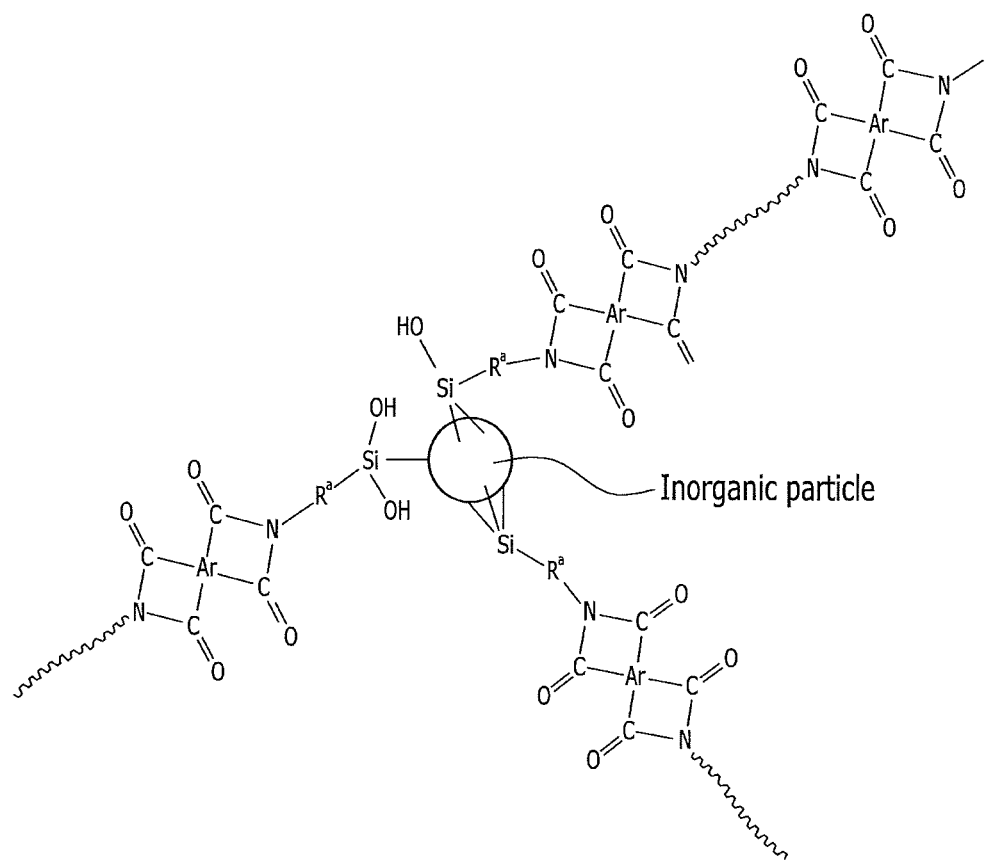
FIG. 1 is a schematic view of a polymer prepared from a composition for preparing a polyimide-inorganic composite material according to an embodiment.

This disclosure will be described more fully hereinafter with reference to the accompanying drawings, in which embodiments are shown. This disclosure may, however, be embodied in many different forms and is not to be construed as limited to the exemplary embodiments set forth herein. Accordingly, the embodiments are merely described below, by referring to the figures, to explain aspects of the present description. As used herein, the term "and/or" includes any and all combinations of one or more of the associated listed items. The term means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})$ $(R^{102})$, wherein $R^{100}$, $R^{101}$, and $R^{102}$ are the same or different, and are each independently a substituted or unsubstituted C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic organic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of at least one. Non-limiting examples of the alkyl group are methyl, ethyl, and propyl.

As used herein, the term "alkenyl group" refers to a straight or branched chain aliphatic hydrocarbon group including at least one double bond, and having the specified number of carbon atoms. Non-limiting examples of the alkenyl group are ethenyl and propenyl.

As used herein, the term "alkynyl group" refers to a straight or branched chain aliphatic hydrocarbon group including at least one triple bond, and having the specified number of carbon atoms. Non-limiting examples of the alkynyl group are ethynyl and propynyl.

As used herein, the term "cycloalkyl group" refers to a monovalent group having one or more saturated rings in which all ring members are carbon and having a specified number of carbon atoms. Non-limiting examples of the cycloalkyl group are cyclopentyl and cyclohexyl.

As used herein, the term "cycloalkenyl group" refers to a monovalent group having one or more rings in which all ring members are carbon, including at least one double bond, and having a specified number of carbon atoms. Non-limiting examples of the cycloalkyl group are cyclopentenyl and cyclohexenyl.

As used herein, the term "cycloalkynyl group" refers to a monovalent group having one or more rings in which all ring members are carbon including at least one triple bond, and having a specified number of carbon atoms. Non-limiting examples of the cycloalkyl group are cyclooctynyl and cyclononynyl.

As used herein, the term "aryl group" refers to an aromatic hydrocarbon containing at least one ring. Non-limiting examples of the aryl group are phenyl, naphthyl, and tetrahydronaphthyl.

As used herein, the term "aralkyl" means a substituted or unsubstituted aryl group covalently linked to an alkyl group that is linked to a compound and having a specified number of carbon atoms. Non-limiting examples of the aralkyl group are benzyl and 2-phenethyl.

As used herein, the terms "alkylene group", "alkenylene group", "alkynylene group", "cycloalkylene group", "cycloalkenylene group", "cycloalkynylene group", "arylene" group", and "aralkylene group" refer to a divalent group respectively derived from an alkyl group, a cycloalkyl group, a heterocycloalkyl group, an aryl group, and a heteroaryl group as defined above.

As used herein, when a definition is not otherwise provide, "electron-withdrawing group" refers to an atom or group that withdraws electron density from a conjugated $\pi$ system via an inductive or resonance electron effect, thus making the $\pi$ system more electrophilic.

As used herein, when a specific definition is not otherwise provided, the term "alkyl group" refers to a C1 to C30 alkyl group, for example a C1 to C15 alkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, for example through S(=O)$_2$, for example an aryl group or a C6 to C30 arylene group, for example a C6 to C16 aryl group or a C6 to C16 arylene group such as phenylene.

As used herein, when a specific definition is not otherwise provided, the term "heterocyclic organic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof in one ring.

As used herein, when a definition is not otherwise provided, "combination" commonly refers to mixing or copolymerization.

In addition, in the specification, the mark "*" may refer to a point of attachment to another atom or group.

According to an embodiment, provided is a composition for preparing a polyimide-inorganic composite material including:

a polyamic acid represented by Chemical Formula 1, a polyimide represented by Chemical Formula 2, or a combination thereof, an inorganic particle precursor, and water;

wherein the polyamic acid, the polyimide, or the combination thereof is a reaction product of a dicarboxylic acid anhydride and a diamine, wherein a mole ratio of the diamine to the dicarboxylic acid anhydride is greater than 0.93 and less than 0.95, and wherein the inorganic particle precursor is included in an amount to provide an inorganic particle in an amount of greater than or equal to about 30 percent by weight (weight %) and less than or equal to about 60 weight % based the total weight of the polyimide-inorganic composite material prepared.

Chemical Formula 1

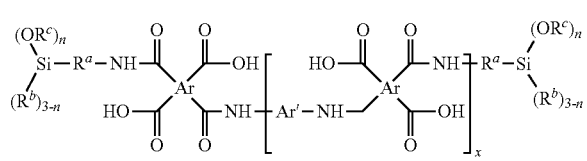

-continued

Chemical Formula 2

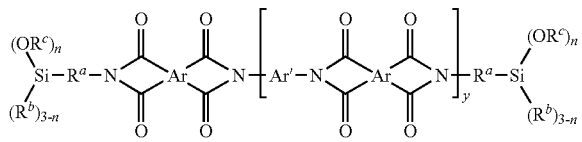

In Chemical Formulae 1 and 2,
Ar may be the same or different in each structure unit, and may be represented by Chemical Formula 3:

Chemical Formula 3

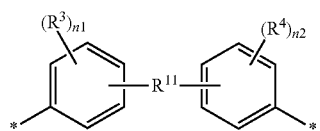

In Chemical Formula 3,
$R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic organic group,
$R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a substituted or unsubstituted C1 to C10 aliphatic organic group, or a silyl group of formula —$SiR^{209}R^{210}R^{211}$, wherein $R^{209}$, $R^{210}$, and $R^{211}$ are the same or different and each are independently a hydrogen, or a substituted or unsubstituted C1 to C10 aliphatic organic group, and
n7 and n8 are the same or different and each are independently an integer ranging from 0 to 3.

In Chemical Formulae 1 and 2,
Ar' may be the same or different in each structure unit, and may be represented by any one of Chemical Formulae 4 to 6:

Chemical Formula 4

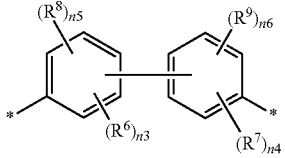

In Chemical Formula 4,
$R^{11}$ is a substituted or unsubstituted C3 to C30 alicyclic organic group, a substituted or unsubstituted C6 to C30 aromatic organic group, a substituted or unsubstituted C2 to C30 heterocyclic organic group, or a substituted or unsubstituted C13 to C20 fluorenylene group,
$R^3$ and $R^4$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{200}$, wherein $R^{200}$ is a substituted or unsubstituted C1 to C10 aliphatic organic group, or a silyl group of formula —$SiR^{201}R^{202}R^{203}$, wherein $R^{201}$, $R^{202}$, and $R^{203}$ are the same or different and each are independently a hydrogen, or a substituted or unsubstituted C1 to C10 aliphatic organic group, and
n1 and n2 are the same or different and each are independently an integer ranging from 0 to 4.

Chemical Formula 5

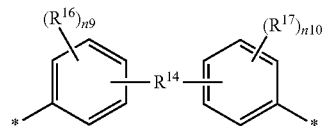

In Chemical Formula 5,
$R^6$ and $R^7$ are the same or different and each are independently an electron withdrawing group,
$R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a substituted or unsubstituted C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a substituted or unsubstituted C1 to C10 aliphatic organic group,
n3 is an integer ranging from 1 to 4,
n5 is an integer ranging from 0 to 3,
provided that n3+n5 is an integer ranging from 1 to 4,
n4 is an integer ranging from 1 to 4, and
n6 is an integer ranging from 0 to 3,
provided that n4+n6 is an integer ranging from 1 to 4.

Chemical Formula 6

In Chemical Formula 6,
$R^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH,
$R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a substituted or unsubstituted C1 to C10 aliphatic organic group, or a silyl group of formula —$SiR^{213}R^{214}R^{215}$, wherein $R^{213}$, $R^{214}$, and $R^{215}$ are the same or different, and each are independently a hydrogen or a substituted or unsubstituted C1 to C10 aliphatic organic group, and n9 and n10 are each independently an integer ranging from 0 to 4.

In Chemical Formulae 1 and 2, $R^a$ may be a substituted or unsubstituted C1-C30 alkylene, a substituted or unsubstituted C2-C30 alkenylene, a C2-C30 substituted or unsubstituted alkynylene, a C3-C30 substituted or unsubstituted cycloalkylene, a substituted or unsubstituted C3-C30 cycloalkenylene, a substituted or unsubstituted C8-C30 cycloalkynylene, a substituted or unsubstituted C6-C30 arylene, or a substituted or unsubstituted C7-C30 arylalkylene, $R^b$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein each of $R^a$ and $R^b$ may be substituted by an acryloxy group, glycidoxy group, or an isocyanato group, $R^c$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, and n may be an integer ranging from 1 to 3.

In Chemical Formulae 1 and 2, x and y are respectively an integer greater than or equal to 1.

Chemical Formula 3 may be represented by Chemical Formula 7 or 8:

Chemical Formula 7

$(R^{12})_{n7}$ $(R^{13})_{n8}$
CF$_3$
CF$_3$

Chemical Formula 8

$(R^{12})_{n7}$
$(R^{13})_{n8}$

In Chemical Formulae 7 and 8, $R^{12}$, $R^{13}$, $n_7$, and $n_8$ are the same as defined in Chemical Formula 3.

Chemical Formula 3 may be represented by Chemical Formula 7, wherein both n7 and n8 are 0.

In Chemical Formula 4, $R^{11}$ may be selected from chemical formulae:

In Chemical Formula 5, $R^6$ and $R^7$ may be the same or different, and may each be independently selected from —CF$_3$, —CCl$_3$, —CBr$_3$, —Cl$_3$, —NO$_2$, —CN, —COCH$_3$, and —CO$_2$C$_2$H$_5$.

In Chemical Formulae 1 and 2, Ar' may be represented by Chemical Formula 5, wherein both $R^6$ and $R^7$ may be —CF$_3$, both n3 and n4 may be 1, and both n5 and n6 may be 0.

In Chemical Formula 1 or 2, a part of Ar may be represented by Chemical Formula 9:

Chemical Formula 9

In Chemical Formulae 1 and 2, x and y may be respectively an integer ranging from 10 to 100, for example, ranging from about 15 to about 90, for example, ranging from about 20 to about 80, for example, ranging from about 25 to about 70, for example, ranging from about 30 to about 60.

The inorganic particle precursor may be selected from an oxide or hydroxide of at least one selected from Ti, Si, Al, Zr, Sn, B, Ce, and a combination thereof.

The inorganic particle precursor may be a precursor of SiO$_2$ or TiO$_2$.

The precursor of SiO$_2$ may include a tetraalkoxysilane, for example, tetramethoxysilane (TMOS), tetraethoxysilane (TEOS), tetrapropoxysilane, tetraisopropoxysilane, tetrabutoxysilane, and the like.

In order to fabricate an OLED display, a low temperature polysilicon ("LTPS"), which requires high temperature process of greater than 400° C., can be utilized as a thin film transition (TFT) utilized. Conventional colorless transparent polyimides are colorless and transparent at the temperature of 300° C., but they are not suitable for use as a transparent substrate when a high temperature process of greater than 400° C. is required, as being heated, these polyimides turn yellow. In general, colorlessness and transparency of a polyimide and the coefficient of thermal expansion ("CTE") of a polyimide are in an inverse relationship. That is, when the CTE is low, the yellowness index ("YI") tends to be high. On the contrary, when the CTE is high, the YI tends to be low. Therefore, it is difficult to prepare a polyimide balancing the above two properties.

The polyimide-inorganic composite material prepared from composition according to an embodiment may maintain high transparency and low CTE when exposed to a high temperature of greater than 400° C. for more than 2 hours. That is, the polyimide-inorganic composite material prepared from composition according to an embodiment may be used in a process of preparing a polyimide material while maintaining high transparency and low CTE when exposed at a high temperature. Accordingly, the composition according to an embodiment may be used to fabricate an optical device, which requires a high temperature process, such as, for example, a low temperature polysilicon ("LTPS") process required for fabrication an OLED.

While organic polymer compounds, such as a polyimide, exhibit good processability, flexibility, insulating properties, corrosion resistance, etc., they may lack thermal resistance and suitable mechanical properties. On the contrary, while inorganic materials, such as, for example, ceramics materials, exhibit good hardness, stability, thermal stability, and the like, they are heavy and fragile. Accordingly, an organic/inorganic hybrid material supplements drawbacks of the two materials while maintaining good properties.

The polyimide-inorganic composite material prepared from a composition according to an embodiment may maintain good properties of the polyimide, such as, for example, transparency, flexibility, insulation properties, processability, and the like, while having further improved transparency and thermal resistance due to the addition of the inorganic material, such as, for example, silica. In an embodiment, the composition may include from about 30 weight % to about 60 weight % of inorganic material based on the total weight of the polyimide-inorganic composite material, which does not suffer from phase separation. Thus, the article prepared from the composition may have high transmittance for light and thermal resistance, and have low CTE. Accordingly, the polyimide-inorganic composite material may be used in a process requiring a high temperature heating.

In the composition for preparing a polyimide-inorganic composite material, the diamine is included in an amount of greater than 0.93 and less than 0.95 of mole ratio to the diamine. Within the above mole ratios, the obtained polyamic acid, polyimide, or a combination thereof may be better crosslinked to the inorganic material in the composition. The polyamic acid, polyimide, or a combination thereof prepared from the diamine and the carboxylic acid dianhydride present in the above mole ratio may have an anhydride or a dicarboxylic acid functionalities at both termini, to which, for example, a silane coupling agent allowing the organic and inorganic materials to polymerize is added. Then the polyamic acid or the polyimide may have at both termini a silanol group derived from the silane coupling agent, as represented by Chemical Formula 1 or 2. The silanol group may be condensed with the hydrolysis product of the inorganic particle precursor, when present with water, to provide a polyamic-acid-inorganic composite material or a polyimide-inorganic composite material.

Further, the polyamic-acid, polyimide, or a combination thereof prepared from the diamine and the carboxylic acid dianhydride, wherein the diamine is included in a mole ratio of greater than 0.93 and less than 0.95 to the diamine, has relatively low degree of polymerization ("DP"), such as, for example, about 30 to 60. Thus the prepared polyamic-acid, polyimide, or a combination thereof may be an oligomer having a relatively low molecular weight of from about 10,000 gram per mole (g/mol) to about 50,000 g/mol. Accordingly, more silane coupling agent may be reacted with both termini of the oligomers, thus rendering a higher degree pf crosslinking of the oligomers and silane coupling agent. As a result, the composition may include more inorganic materials without phase separation, resulting in a polyimide-inorganic composite material having good properties of the polyimide and the inorganic material.

The composition according to an embodiment may form a 'sot' by the hydrolysis condensation reaction of the inorganic precursor. The composition in a 'sot' state may be casted on a substrate by various known methods, dried, and further heat treated to form polyimide-inorganic composite material.

The silane coupling agent may include a compound represented by Chemical Formula 10:

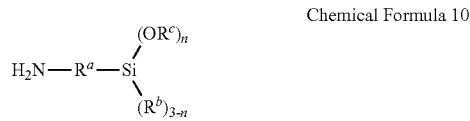

Chemical Formula 10

In Chemical Formula 10, $R^a$, $R^b$, $R^c$, and n are the same as defined in Chemical Formulae 1 and 2.

The compound represented by Chemical Formula 10 may include aminopropyl trimethoxy silane ("APS"), aminopropyl triethoxy silane, etc.

According to another embodiment, provided is an article prepared from a composition for preparing a polyimide-inorganic composite material.

The article may be a film, fiber, coating material, or an adhesive.

The article may have a transmittance of greater than or equal to about 80% for light in a wavelength range of from 400 nanometers to 750 nanometers.

The article may have a transmittance of greater than or equal to about 70% for light at a wavelength of 430 nanometers.

The article may have a transmittance of greater than or equal to about 80% for light when exposed at a temperature of 400° C. for at least 2 hours. That is, the article may maintain a very high transmittance at a high temperature.

The article may have a coefficient of thermal expansion ("CTE") of less than or equal to about 50 parts per million/° C. (ppm/° C.) in a temperature range of from 50° C. to 400° C.

The CTE value is characterized by a very low range. Further, the article may have a low CTE of less than or equal to about 50 ppm/° C. The article may further have a high transmittance, which is not easy to obtain. Accordingly, the article according to an embodiment may be used in a process requiring a high temperature, such as in a process for fabricating an optical device.

According to yet another embodiment, provided is a display device including the article according to an embodiment.

The display device may include a liquid crystal display (LCD), an organic light emitting diode (OLED), and the like, but is not limited thereto.

Figure 2:
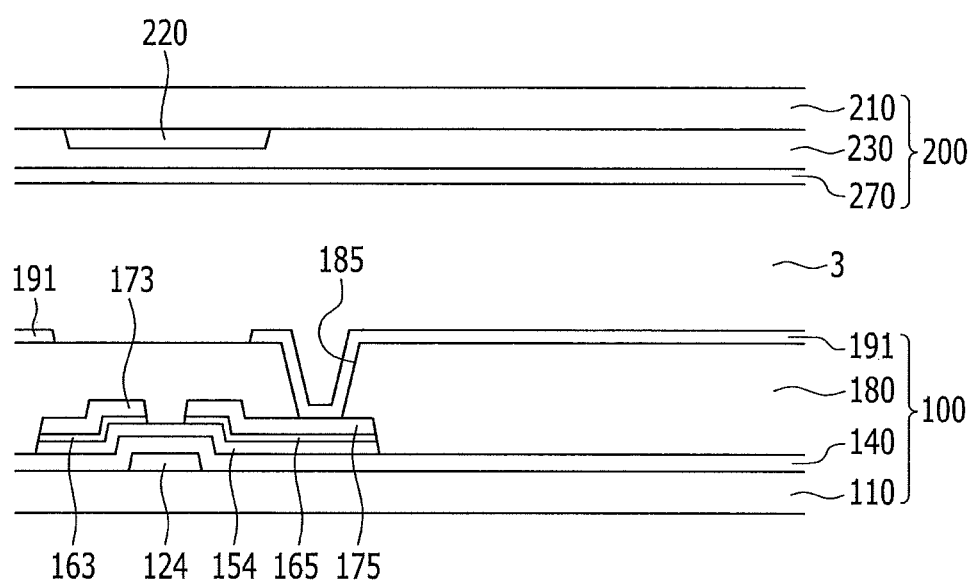
FIG. 2 is a cross-sectional view of a liquid crystal display ("LCD") in accordance with an embodiment.

Among the display devices, a liquid crystal display (LCD) is described by referring to FIG. 2. FIG. 2 is a cross-sectional view of a liquid crystal display (LCD) in accordance with an embodiment.

Referring to FIG. 2, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and face each other with the gate electrode 124 disposed between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described in detail.

In the common electrode panel 200, a lighting member 220, referred to as a black matrix, is disposed on a substrate 210, a color filter 230 is disposed on the substrate 210 and the lighting member 220, and a common electrode 270 is formed on the color filter 230.

Herein, the substrates 110 and 210 may be articles including the composite including the poly(amide-imide) copolymer and inorganic particles.

Figure 3:
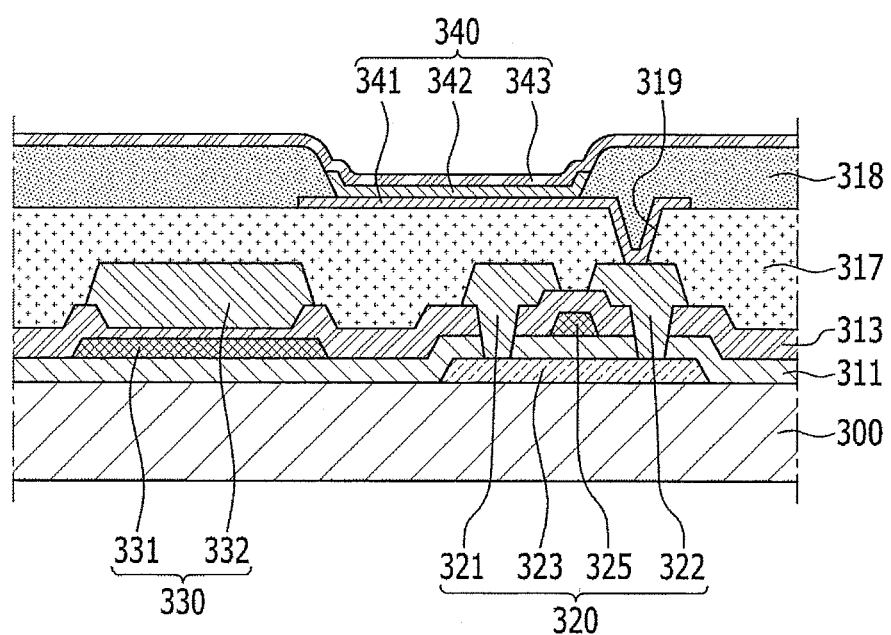
FIG. 3 is a cross-sectional view of an organic light emitting diode ("OLED") in accordance with an embodiment.

Among the display devices, an organic light emitting diode (OLED) is described by referring to FIG. 3. FIG. 3 is a cross-sectional view of an organic light emitting diode (OLED) in accordance with an embodiment.

Referring to FIG. 3, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be a part of an article including the composite including the poly(amide-imide) copolymer and inorganic particles.

Hereafter, the embodiments are described in detail with reference to examples. The following examples and comparative examples are not restrictive, but are illustrative.

EXAMPLES

Example 1

Preparation of Composition for Preparing Polyimide-Inorganic Composite Material 12.040 grams (g) (0.0376 mole) of TFDB is dissolved in 80 milliliters (mL) of NMP in a 250 mL 4-neck double walled reactor, equipped with a mechanical stirrer and a nitrogen inlet at 20° C. under nitrogen atmosphere. 17.960 g (0.0404 mole) of 6-FDA is added. The mixture is stirred for 24 hours (hrs) at 20° C. under nitrogen atmosphere to prepare a polyamic acid having anhydride termini. To this solution, 1.2529 g of r-APS (0.00566 mole) is added and the reaction mixture is stirred for 6 hours under nitrogen atmosphere to prepare a polyamic acid having silane termini.

To the solution, 67.518 g of tetramethoxy silane (TMOS, 0.4436 mole) is added, and after the TMOS completely dissolves, 56.1 mL/31.9 mL of NMP/water mixture is added. The mixture is stirred for 48 hours under nitrogen atmosphere to provide a hybrid solution of a polyamic-acid having a silanol group at both termini and silica sol solution.

Examples 2 to 4

Preparation of Composition for Preparing Polyimide-Inorganic Composite Material

The same process is used in Examples 2 to 4 and Comparative Examples 1 to 3 to prepare hybrid solutions of polyamic acid oligomer and silica sol as in Example 1, except for the type and amount of the reactants, as summarized in Table 1 below.

TABLE 1

| | Diamine/ Dianhydride ratio | NMP (ml) | Dianhydride (mol) 6FDA | Dianhydride (mol) PMDA | Diamine (mol) TFDB | APS (mol) | Inorganic Precursor type | Inorganic Precursor Amount (mol) | Water (mol) | Silica (%) |
|---|---|---|---|---|---|---|---|---|---|---|
| Comparative Example 1 | 0.93 | 136.1 | 0.0404 | — | 0.0376 | 0.00566 | TMOS | 0.4436 | 1.7742 | 47.0 |
| Comparative Example 2 | 0.95 | 119.8 | 0.0353 | — | 0.0335 | 0.003527 | TMOS | 0.1458 | 0.5833 | 24.9 |
| Comparative Example 3 | 0.96 | 136.0 | 0.0399 | — | 0.0383 | 0.003193 | TMOS | 0.1707 | 0.6828 | 25.5 |
| Example 1 | 0.935 | 105.0 | 0.0452 | — | 0.0422 | 0.005874 | TMOS | 0.4651 | 1.8602 | 45.4 |
| Example 2 | 0.937 | 134.9 | 0.0451 | — | 0.0423 | 0.005688 | TMOS | 0.4657 | 1.8629 | 45.4 |
| Example 3 | 0.94 | 136.1 | 0.0459 | — | 0.0454 | 0.005797 | TMOS | 0.3582 | 1.4328 | 37.4 |
| Example 4 | 0.94 | 113.8 | 0.0414 | 0.0046 | 0.0433 | 0.054102 | TEOS | 0.2956 | 1.1863 | 34.6 |

Preparation Examples and Analysis

Preparation of Polyimide-Silica Hybrid Film and Analysis Thereof

Films are prepared by casting the hybrid solutions prepared in Examples 1 to 4 and Comparative Examples 1 to 3, respectively, on a glass substrate by spin-coating. Thus prepared films are dried stepwise. Drying conditions are as follows. Heat treat the films on a hot plate at 100° C. for 15 hours to evaporate the solvent. Then, place the films into a furnace, raise the temperature to 400° C., and then—cool the film to room temperature.

The optical and thermal properties of the films prepared as above have been determined, and are summarized in Table 2 below. Optical properties are determined after the films have been exposed to a temperature of 400° C. for 2 hours, and the thermal properties are determined for the films cured at 400° C. for 30 minutes.

Analysis methods are as follows:

The thickness values of the films are measured with "mitutoyo" micrometer tool with the accuracy of ±1 μm.

Optical properties are measured with "Konica Minolta CM3600d" spectrophotometer on the transmittance opacity/haze mode.

CTE is measured on TMA Q400 (TA Instruments, U.S.A.) with the following heating program. The value is obtained in the second scanning. The measurement range is 50~150° C., 50~250° C., 50~300° C., 50~350° C., and 50~400° C.

First scanning: 5 minute isothermal→rump to 300° C. at a heating rate of 5° C./min.→cooling to 40° C.

Second scanning: rump to 430° C. at a heating rate of 5° C./min.

As shown from Table 2, the properties of the film obtained according to Comparative Example 1 prepared from a dianhydride and a diamine, wherein the mole ratio of diamine to the dianhydride is 0.93, cannot be determined as the film is very fragile.

In Comparative Examples 2 and 3, the mole ratio of diamine to the dianhydride is greater than 0.95, and the optical properties at high temperature are good, while the CTE values are very high and greater than 100 ppm/° C.

All the films according to Examples 1 to 4 have good optical properties and low CTE values.

Figure 4:
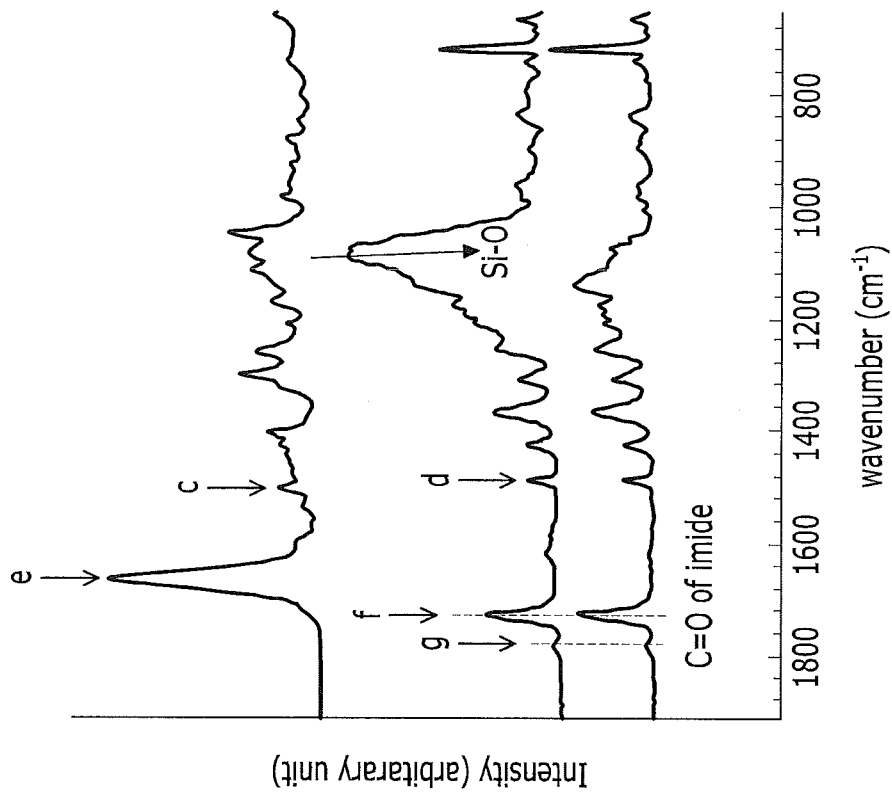
FIG. 4 is a graph of intensity (arbitrary unit, a. u.) versus wavenumber (reverse centimeters, $cm^{-1}$), which is a FT-IR spectroscopy graph showing conversion of a polyamic acid-silica sol solution to a polyimide-silica hybrid film, in which graph (a) shows the state before combining the polyamic acid oligomers and precursors of silica, graph (b) shows the state where precursors of silica bind to the termini of the polyamic acid oligomers by hydrolysis reaction, and graph (c) shows the state where the polyamic acid-silica sol hybrid is imidized, respectively.

Meanwhile, FIG. 4 is FT-IR spectroscopy graphs showing conversion of a polyamic acid-silica sol solution prepared in Example 1 to a polyimide-silica hybrid film prepared as described above. In FIG. 4, graph (a) shows the state before combining of the polyamic acid oligomers and precursors of silica, graph (b) shows the state where precursors of silica bind to the termini of the polyamic acid oligomers by hydrolysis reaction, and graph (c) shows the state where the polyamic acid-silica sol hybrid is imidized, respectively. In graph (a), a peak at 1535 reverse centimeters ($cm^{-1}$) indicating N—H bonding (N—H bend) of the amide in the polyamic acid and a peak at 1684 $cm^{-1}$ indicating C═O stretching (C═O stretching) of the amide in the polyamic acid are shown. In graphs (b) and (c), the peaks are not shown, but a peak at 1731 $cm^{-1}$ indicating symmetric C═O stretching in the imide and a peak at 1785 $cm^{-1}$ indicating asymmetric C═O stretching in the imide are shown. Further, in graph (b) a broad band from about 1000 $cm^{-1}$ to about 1200 $cm^{-1}$ indicating Si—O stretching due to the introduction of silica is shown.

TABLE 2

| | Transmittance IV | Transmittance @ 10 μm | YI | Haze | CTE 50~300° C. | CTE 50~400° C. | Td @ 400° C./ 4 h | Rth @10 μm |
|---|---|---|---|---|---|---|---|---|
| Comparative Example 1 | 0.973 | | | Brittle | | | | |
| Comparative Example 2 | 1.086 | 90.3 75.4 83.7 | 4.2 | 1.8 | 1.086 | 43 | 104 | 0.75 |
| Comparative Example 3 | 1.098 | 90.3 77.5 85.2 | 5.3 | 1.9 | 1.098 | 68 | 179 | 0.59 |
| Example 1 | — | 90.5 72.9 83.0 | 5.7 | 1.2 | — | 19 | 24 | 0.77 |
| Example 2 | — | 90.8 76.0 84.7 | 4.6 | 0.9 | — | 13 | 12 | 0.69 |
| Example 3 | 1.037 | 90.4 75.5 83.8 | 4.4 | 0.2 | 1.037 | 11 | 8 | 0.74 |
| Example 4 | — | 89.9 68.1 80.4 | 6.4 | 1.1 | — | 23 | 26 | — |

Experiment Example 1

Measurement of CTE Versus Silica Content

A polyamic acid is prepared with 6FDA and TFDB in the same mole ratio as in Example 3, while the silica content is varied to prepare polyamic acid-silica hybrid solutions. After preparing films with the hybrid solutions according to the same method as described above, CTE values depending on the silica content are measured and shown in FIG. 5.

Figure 5:
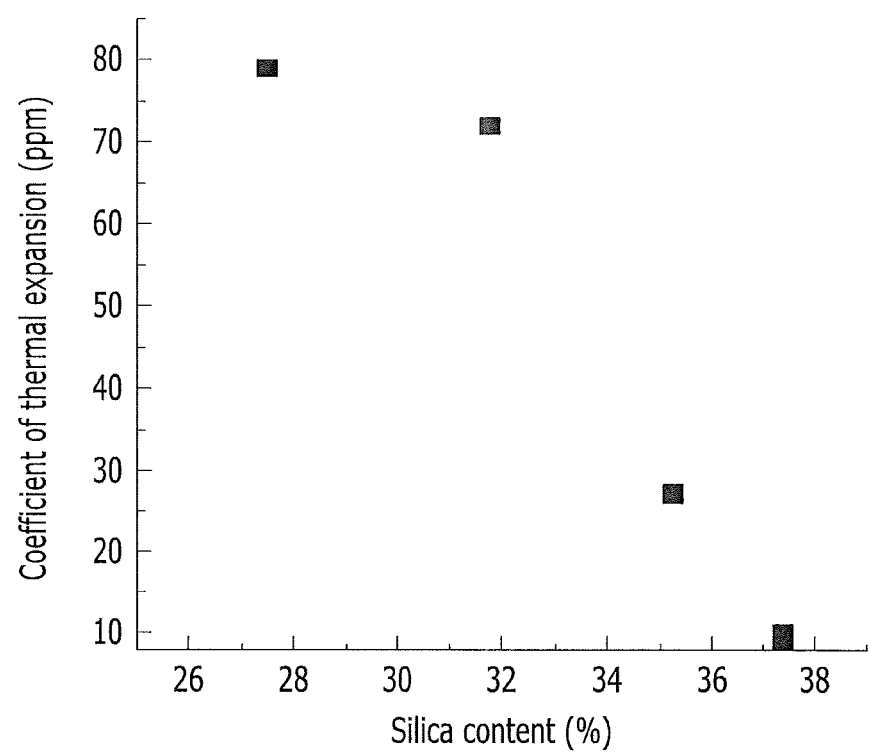
FIG. 5 is a graph of coefficient of thermal expansion (CTE) (parts per million, ppm) versus silica content (percent, %) in the polyimide-silica composite material prepared in the Examples and Comparative Examples.

As shown from FIG. 5, the CTE gradually decreases when the amount of silica is less than or equal to 30 wt %, and it sharply decreases when the silica content exceeds 30 wt %. That is, in order to lower the CTE of the polyimide-silica hybrid film, the silica content in the film should be not greater than 30 wt %.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A composition for preparing a polyimide-inorganic composite material comprising:
   a polyamic acid represented by Chemical Formula 1, a polyimide represented by Chemical Formula 2, or a combination thereof;
   an inorganic particle precursor; and
   water,
   wherein the polyamic acid, the polyimide, or the combination thereof is a reaction product of a dicarboxylic acid anhydride and a diamine,
   wherein a mole ratio of the diamine to the dicarboxylic acid anhydride is greater than 0.93 and less than 0.95, and
   wherein the inorganic particle precursor is included in an amount to provide an inorganic particle in an amount of greater than or equal to about 30 percent by weight and less than or equal to about 60 percent by weight based the total weight of the polyimide-inorganic composite material:

Chemical Formula 1

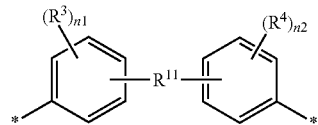

Chemical Formula 2

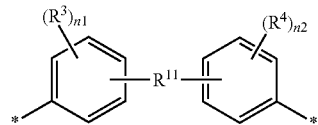

wherein in Chemical Formulae 1 and 2,
all Ar groups are represented by Chemical Formula 3, or a part of Ar groups are represented by Chemical Formula 3, and the other Ar groups are represented by Chemical Formula 9:

Chemical Formula 3

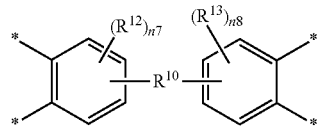

Chemical Formula 9

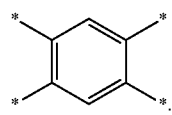

wherein in Chemical Formula 3,
$R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic organic group,
$R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a substituted or unsubstituted C1 to C10 aliphatic organic group, or a silyl group of formula —$SiR^{209}R^{210}R^{211}$, wherein $R^{209}$, $R^{210}$, and $R^{211}$ are the same or different and each are independently a hydrogen, or a substituted or unsubstituted C1 to C10 aliphatic organic group, and
n7 and n8 are the same or different and each are independently an integer ranging from 0 to 3;
wherein in Chemical Formulae 1 and 2,
Ar' is the same or different in each structure unit, and is represented by any one of Chemical Formulae 4 to 6:

Chemical Formula 4 wherein in Chemical Formula 4,
$R^{11}$ is a substituted or unsubstituted C3 to C30 alicyclic organic group, a substituted or unsubstituted C6 to C30 aromatic organic group, or a substituted or unsubstituted C2 to C30 heterocyclic organic group,
$R^{3}$ and $R^{4}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{200}$, wherein $R^{200}$ is a substituted or unsubstituted C1 to C10 aliphatic organic group, or a silyl group of formula —$SiR^{201}R^{202}R^{203}$, wherein $R^{201}$, $R^{202}$, and $R^{203}$ are the same or different and each are independently a hydrogen, or a substituted or unsubstituted C1 to C10 aliphatic organic group, and n1 and n2 are the same or different and each are independently an integer ranging from 0 to 4;

Chemical Formula 5

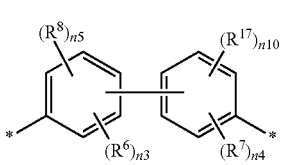

wherein in Chemical Formula 5,
$R^6$ and $R^7$ are the same or different and each are independently an electron withdrawing group,
$R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a substituted or unsubstituted C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a substituted or unsubstituted C1 to C10 aliphatic organic group,
n3 is an integer ranging from 1 to 4,
n5 is an integer ranging from 0 to 3,
provided that n3+n5 is an integer ranging from 1 to 4,
n4 is an integer ranging from 1 to 4, and
n6 is an integer ranging from 0 to 3,
provided that n4+n6 is an integer ranging from 1 to 4;

Chemical Formula 6

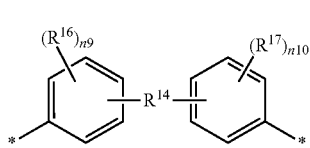

wherein in Chemical Formula 6,
$R^{14}$ is O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, C(=O)NH, or a substituted or unsubstituted C6 to C30 aromatic organic group, wherein the aromatic organic group comprises one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, and C(=O)NH,
$R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a substituted or unsubstituted C1 to C10 aliphatic organic group, or a silyl group of formula —$SiR^{213}R^{214}R^{215}$, wherein $R^{213}$, $R^{214}$, and $R^{215}$ are the same or different, and each are independently a hydrogen or a substituted or unsubstituted C1 to C10 aliphatic organic group, and
n9 and n10 are each independently an integer ranging from 0 to 4, wherein in Chemical Formulae 1 and 2,
$R^a$ is a substituted or unsubstituted C1-C30 alkylene, a substituted or unsubstituted C2-C30 alkenylene, a substituted or unsubstituted C2-C30 alkynylene, a substituted or unsubstituted C3-C30 cycloalkylene, a substituted or unsubstituted C3-C30 cycloalkenylene, a substituted or unsubstituted C8-C30 cycloalkynylene, a substituted or unsubstituted C6-C30 arylene, or a substituted or unsubstituted C7-C30 arylalkylene,
$R^b$ is hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl,
wherein each of $R^a$ and $R^b$ are substituted with an acryloxy group, glycidoxy group, or a isocyanato group,
$R^c$ is hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl,
n is an integer ranging from 1 to 3, and
x and y are independently an integer greater than or equal to 1.

2. The composition according to claim 1, wherein the inorganic particle precursor is selected from an oxide or hydroxide of Ti, Si, Al, Zr, Sn, B, Ce, or a combination thereof.

3. The composition according to claim 1, wherein the inorganic particle precursor is a precursor of SiO$_2$ or TiO$_2$.

4. The composition according to claim 1, wherein the inorganic precursor is selected from tetramethoxysilane, tetraethoxysilane, tetrapropoxysilane, tetraisopropoxysilane, and tetrabutoxy silane.

5. The composition according to claim 1, wherein Chemical Formula 3 is represented by Chemical Formula 7 or 8:

Chemical Formula 7

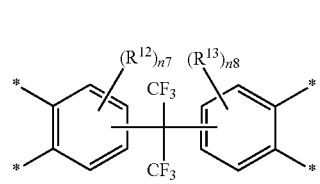

Chemical Formula 8

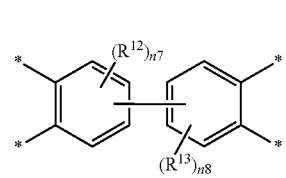

wherein in Chemical Formulae 7 and 8,
$R^{12}$, $R^{13}$, n7, and n8 are the same as in claim 1.

6. The composition according to claim 4, wherein Chemical Formula 3 is represented by Chemical Formula 7:

Chemical Formula 7

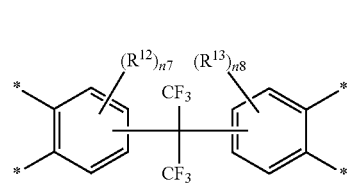

wherein, in Chemical Formula 7, both n7 and n8 are 0.

7. The composition according to claim 1, wherein $R^{11}$ in Chemical Formula 4 is selected from chemical formulae:

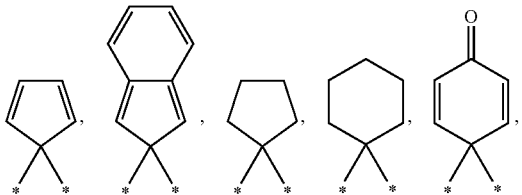

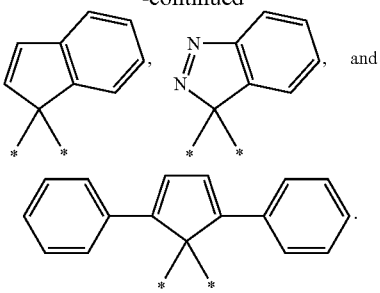

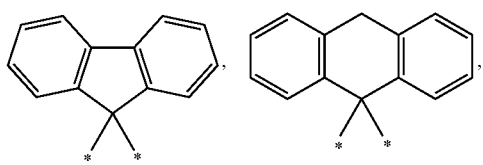

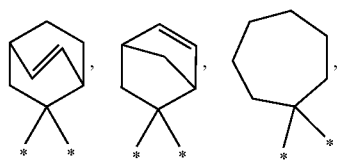

8. The composition according to claim 1, wherein $R^6$ and $R^7$ in Chemical Formula 5 are the same or different, and are independently selected from —$CF_3$, —$CCl_3$, —$CBr_3$, —$Cl_3$, —$NO_2$, —CN, —$COCH_3$, and —$CO_2C_2H_5$.

9. The composition according to claim 1, wherein in Chemical Formulae 1 and 2,
Ar' is represented by Chemical Formula 5,
wherein, in Chemical Formula 5, both $R^6$ and $R^7$ are —$CF_3$, both n3 and n4 are 1, and both n5 and n6 are 0.

10. The composition according to claim 1, wherein in Chemical Formulae 1 and 2, x and y are independently an integer ranging from 10 to 100.

11. The composition according to claim 1, wherein in Chemical Formulae 1 and 2, x and y are independently an integer ranging from 20 to 80.

12. The composition according to claim 1, wherein in Chemical Formulae 1 and 2, x and y are independently an integer ranging from 30 to 60.

* * * * *